United States Patent [19]
Sugiyama

[11] Patent Number: 4,985,768
[45] Date of Patent: Jan. 15, 1991

[54] INTER-FRAME PREDICTIVE ENCODING SYSTEM WITH ENCODED AND TRANSMITTED PREDICTION ERROR

[75] Inventor: Kenji Sugiyama, Noda, Japan

[73] Assignee: Victor Company of Japan, Ltd., Japan

[21] Appl. No.: 465,747

[22] Filed: Jan. 18, 1990

[30] Foreign Application Priority Data

Jan. 20, 1989 [JP] Japan .................................. 1-11587
Feb. 14, 1989 [JP] Japan .................................. 1-34161

[51] Int. Cl.$^5$ .............................................. H04N 7/12
[52] U.S. Cl. ..................................... 358/136; 358/135
[58] Field of Search ......................... 358/136, 135, 105

[56] References Cited
U.S. PATENT DOCUMENTS
4,383,272 5/1983 Netravali et al. .................... 358/136

FOREIGN PATENT DOCUMENTS
61-248692 11/1986 Japan .

Primary Examiner—Victor R. Kostak
Attorney, Agent, or Firm—Lowe, Price, LeBlanc, Becker & Shur

[57] ABSTRACT

In an inter-frame predictive encoding system, reference frames are set. The reference frames are separated at equal intervals. The reference frames are selected from successively inputted frames of a video signal. Each of the reference frames is encoded. A prediction signal for a dependent frame between the reference frames is generated on the basis of a signal of the reference frames which precedes and follows the dependent frame respectively. A signal of the dependent frame is generated on the basis of the prediction signal corresponding thereto. An error of the predicting of the signal of the dependent frame is encoded.

5 Claims, 7 Drawing Sheets

INTER-FRAME PREDICTIVE ENCODING SYSTEM WITH ENCODED AND TRANSMITTED PREDICTION ERROR

BACKGROUND OF THE INVENTION

This invention relates to an inter-frame predictive encoding system for a video signal.

In a general video signal, display information of a frame tends to correlate with display information of a subsequent frame and a preceding frame. In the transmission of a digitized video signal, such a correlation between successive frames is used in reducing a digital data transmission rate.

Inter-frame predictive encoding uses the correlation between successive frames to reduce the digital data transmission rate. The inter-frame predictive encoding is generally effective in handling a video signal representing moving pictures.

As will be explained later, a prior-art inter-frame predictive encoding system has some problems.

SUMMARY OF THE INVENTION

It is an object of this invention to provide an improved inter-frame predictive encoding system.

According to a first aspect of this invention, an inter-frame predictive encoding system comprises means for setting reference frames separated at equal intervals, the reference frames being selected from successively inputted frames of a video signal; means for encoding each of the reference frames; means for generating a prediction signal for a dependent frame between the reference frames on the basis of a signal of the reference frames which precedes and follows the dependent frame respectively; means for predicting a signal of the dependent frame on the basis of the prediction signal corresponding thereto; and means for encoding an error of said predicting of the signal of the dependent frame.

According to a second aspect of this invention, an inter-frame predictive encoding system comprises means for separating successively-inputted frames of a video signal into reference frames and dependent frames, the reference frames being spaced at predetermined intervals, the dependent frames residing between the reference frames; means for encoding display information of the reference frames; means for predicting display information of each dependent frame on the basis of display information of reference frames which precede and follow said dependent frame respectively; means for generating an error between the predicted display information and corresponding actual display information of said dependent frame; and means for encoding said error.

According to a third aspect of this invention, an inter-frame predictive encoding system comprises means for performing motion-compensated inter-frame prediction using motion vectors between successively inputted frames of a video signal; the improvement comprising means for setting specified frames separated at equal intervals, the specified frames being selected from successively inputted frames of a video signal; means for detecting motion vectors between the specified frames; means for detecting motion vectors between adjacent non-specified frames between the specified frames as differences with respect to said motion vectors between the specified frames.

DESCRIPTION OF THE PRIOR ART

Figure 1:
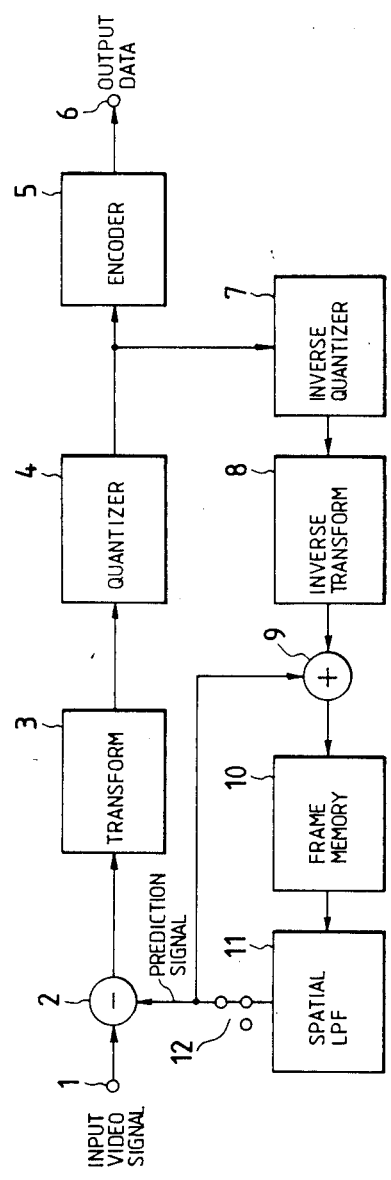
FIG. 1 is a block diagram of a conventional inter-frame predictive encoding system.

FIG. 1 shows a conventional inter-frame predictive encoding system. With reference to FIG. 1, a digitized video signal is fed to a subtracter 2 via an input terminal 1. The subtracter 2 subtracts a prediction digital signal from the digitized video signal to generate a prediction error (difference) signal. The prediction signal will be explained later.

The prediction error signal outputted from the substracter 2 is subjected to an orthogonal transform by an orthogonal transform device 3. The orthogonal transform increases the efficiency of encoding. The output signal from the orthogonal transform device 3 is quantized by a quantizer 4. The output data from the quantizer 4 is encoded by an encoder 5 into variable-length codes such as Huffman codes. The codes outputted from the encoder 5 are transmitted via an output terminal 6.

The output data from the quantizer 4 is subjected to an inverse quantization by an inverse quantizer 7 so that it is converted into a representative (setting of a representative). The representative outputted from the inverse quantizer 7 is subjected to an inverse orthogonal transform by an inverse transform device 8. The output signal from the inverse transform device 8 corresponds to a prediction error (difference) which is generated through a decoding process in a decoding system explained later. An adder 9 adds the prediction error and a one-frame preceding prediction signal, generating a digitized video signal which corresponds to a digitized video signal generated by a decoding process in the decoding system. A frame memory 10 delays the output signal from the adder 9 by a time corresponding to a period of one frame. The output signal from the frame memory 10 is passed through a spatial low pass filter (a spatial LPF) 11, being converted into the prediction signal. The prediction signal is fed from the spatial LPF 11 to the subtracter 2 and the adder 9 via a switch 12. The spatial LPF 11 multiples the output data from the adder 9 by a coefficient which varies with a spatial frequency. The spatial LPF 11 ensures that a quantization error remains in the prediction error at a reduced rate. The spatial LPF 11 is effective and advantageous since a larger quantity of quantization errors are present in a high-frequency range and an inter-frame correlation is weakened by noises in the high-frequency range.

The switch 12 periodically couples and uncouples the spatial LPF 11 to and from the subtracter 2 and the adder 9 to periodically reset the inter-frame prediction. The period of the resetting the inter-frame prediction is generally set so as to correspond to 30 to 100 frames. When the inter-frame prediction is being reset, the prediction signal is fixed and essentially intra-frame coding is performed. The resetting prevents calculation errors from accumulating up to an unacceptable level. The calculation error would result from error codes generated in a transmission line and mismatching between orthogonal converters of a transmitter side and a receiver side in recursive-type inter-frame predictive encoding such as shown in FIG. 1. A shorter period of the resetting enables calculating errors from less accumulating but decreases the efficiency of the encoding.

Figure 2:
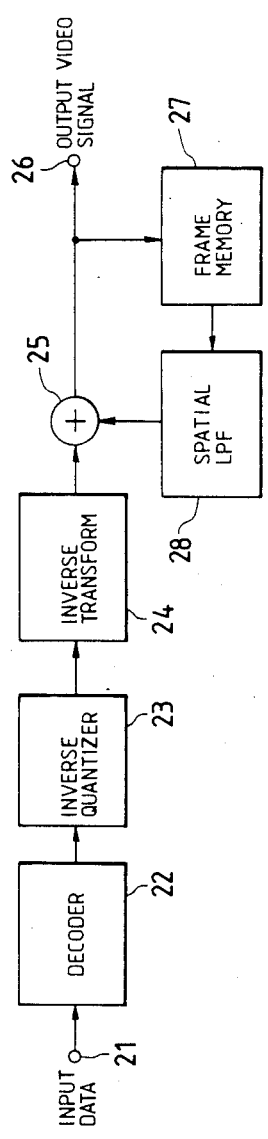
FIG. 2 is a block diagram of a conventional decoding system.

FIG. 2 shows a conventional decoding system designed for the combination with the encoding system of FIG. 1. With reference to FIG. 2, variable-length digital data is fed to a decoder 22 via an input terminal 21. The decoder 22 converts the variable-length data into original fixed-length data. The output data from the decoder 22 is subjected to an inverse quantization by an inverse quantizer 23 so that it is converted into a representative (setting of a representative). The representative outputted from the inverse quantizer 23 is subjected to an inverse orthogonal transform by an inverse transform device 24. The output signal from the inverse transform device 24 corresponds to a prediction error (difference). An adder 25 adds the prediction error and a one-frame preceding prediction signal, generating a digitized video signal. A frame memory 27 delays the output signal from the adder 25 by a time corresponding to a period of one frame. The output signal from the frame memory 27 is passed through a spatial low pass filter (a spatial LPF) 28, being converted into the prediction signal. The prediction signal is fed from the spatial LPF 28 to the adder 25. The spatial LPF 28 is similar to the spatial LPF 11 of the encoding system.

The conventional encoding system of FIG. 1 and the conventional decoding system of FIG. 2 have problems as follows. In the case where these conventional systems are used for recording and reproducing data into a storage medium such as an information recording disk or an information recording tape, a short period of resetting the inter-frame prediction is necessary to decode data from arbitrary storage locations of the recording medium during a random access or a search. Especially, a visual search requires a very short period of resetting the inter-frame prediction since the decoding is performed at intervals of several frames. The short period of resetting the inter-frame prediction decreases the efficiency of encoding.

In the case of reverse play back from the recording medium, the predictive decoding is impossible since the direction of a time axis is opposite to the direction of a time axis which occurs during the encoding and recording.

Since the inter-frame prediction uses the preceding frame but does not use the subsequent frame, the accuracy and efficiency of the prediction tends to be inadequate. When a picture represented by data changes greatly or when a scene represented by data changes, the inter-frame prediction tends to be unreliable.

Since it is necessary for the encoding system to also perform the decoding process, the structure of the encoding system tends to be complicated.

DESCRIPTION OF THE FIRST PREFERRED EMBODIMENT

Figure 3:
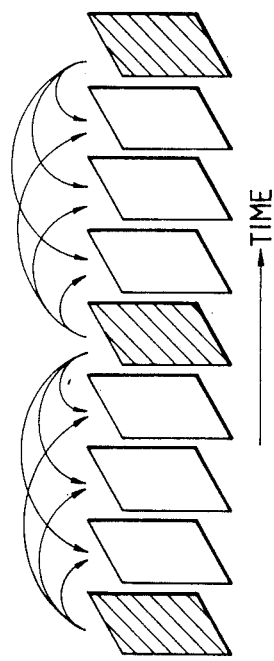
FIG. 3 is a diagram of a stream of successive frames in an inter-frame predictive encoding system and a decoding system according to a first embodiment of this invention.

In an inter-frame predictive encoding system and an inter-frame predictive decoding system according to a first embodiment of this invention, as shown in FIG. 3, frames are separated into independent frames (denoted by hatched squares) and dependent frames (white squares). The independent frames are also referred to as the reference frames. On a time axis, the independent frames are separated at predetermined equal intervals corresponding to two or more frames. A predetermined number of dependent frames are present between two adjacent independent frames. Display information in an independent frame is encoded independent of other frames. Display information in a dependent frame is encoded by prediction using the preceding and subsequent independent frames.

Figure 4:
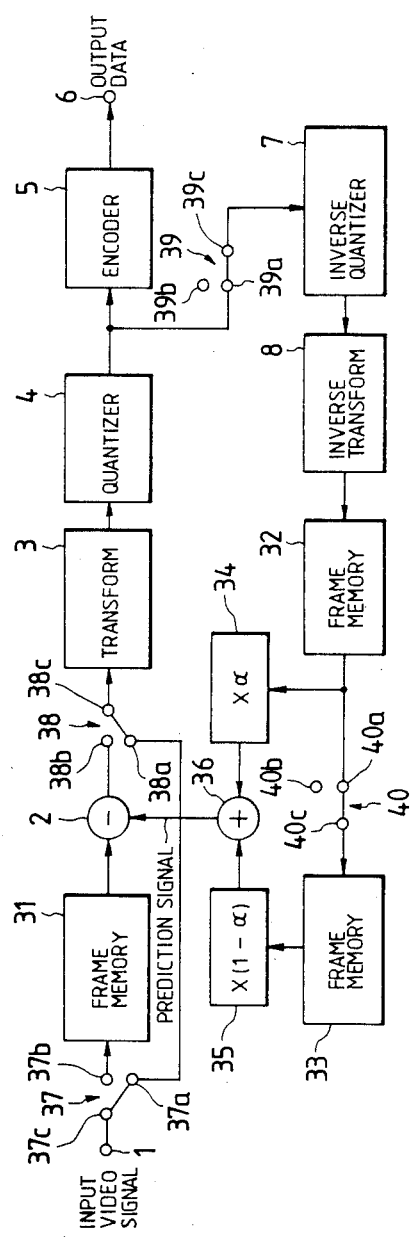
FIG. 4 is a block diagram of the inter-frame predictive encoding system according to the first embodiment of this invention.

FIG. 4 shows an inter-frame predictive encoding system according to a first embodiment of this invention. With reference to FIG. 4, a digitized video signal is fed to a movable contact 37c of a switch 37 via an input terminal 1. The movable contact 37c of the switch 37 periodically changes between a first position and a second position at a predetermined period. When the movable contact 37c of the switch 37 assumes the first position, it contacts with a first fixed contact 37a of the switch 37 and separates from a second fixed contact 37b of the switch 37. When the movable contact 37c of the switch 37 assumes the second position, it contacts with the second fixed contact 37b of the switch 37 and separates from the first fixed contact 37a of the switch 37. As will be made clear hereinafter, when the movable contact 37c of the switch 37 contacts with the first fixed contact 37a of the switch 37, the frame represented by the current input video signal is defined as an independent frame. Otherwise, the frame represented by the current input video signal is defined as a dependent frame.

When the movable contact 37c of the switch 37 contacts with the first fixed contact 37a of the switch 37, the input video signal is transmitted through the switch 37 to a first fixed contact 38a of a switch 38. A movable contact 38c of the switch 38 is connected to an input terminal of an orthogonal transform device 3. The movable contact 38c of the switch 38 periodically contacts with and separates from the first fixed contact 38a and a second fixed contact 38b of the switch 38 in a manner and at a timing similar to those of the switch 37. Specifically, when the movable contact 37c of the switch 37 contacts with the first fixed contact 37a of the switch 37, the movable contact 38c of the switch 38 contacts with the first fixed contact 38a of the switch 38 so that the input video signal is further transmitted through the switch 38 to the orthogonal transform device 3.

When the movable contact 37c of the switch 37 contacts with the second fixed contact 37b of the switch 37, the input video signal is transmitted through the switch 37 to a multi-frame memory 31. The multi-frame memory 31 delays the input video signal by a time corresponding to a predetermined number of frames. Specifically, the delay time of the multi-frame memory 31 corresponds to (N−1) frames in the case where one independent frame occurs per N successive frames and the letter N denotes a predetermined natural number equal to two or greater. The output video signal from the multi-frame memory 31 is fed to a subtracter 2. The subtracter 2 substracts a prediction signal from the video signal to generate a prediction error (difference) signal. The prediction signal will be explained later. The prediction error signal is outputted from the subtracter 2 to the second fixed contact 38b of the switch 38. When the movable contact 37c of the switch 37 contacts with the second fixed contact 37b of the switch 37, the movable contact 38c of the switch 38 contacts with the second fixed contact 38b of the switch 38 so that the prediction error signal is transmitted through the switch 38 to the orthogonal transform device 3.

During one-frame periods separated by equal intervals corresponding to a predetermined number of frames, that is, during periods corresponding to independent frames, the movable contact 37c of the switch 37 contacts with the first fixed contact 37a of the switch 37 while the movable contact 38c of the switch 38 contacts with the first fixed contact 38a of the switch 38. During other periods, that is, during periods corresponding to dependent frames, the movable contact 37c of the switch 37 contacts with the second fixed contact 37b of the switch 37 while the movable contact 38c of the switch 38 contacts with the second fixed contact 38b of the switch 38.

The independent-frame video signal or the dependent-frame prediction error signal outputted from the subtracter 2 is subjected to an orthogonal transform by the orthogonal transform device 3. The orthogonal transform increases the efficiency of encoding. The output signal from the orthogonal transform device 3 is quantized by a quantizer 4. The output data from the quantizer 4 is encoded by an encoder 5 into variable-length codes such as Huffman codes. The codes outputted from the encoder 5 are transmitted via an output terminal 6.

The output data from the quantizer 4 is applied to a first fixed contact 39a of a switch 39. A second fixed contact 39b of the switch 39 has no connection with other circuits. The movable contact 39c of the switch 39 is connected to an input terminal of an inverse quantizer 7. The movable contact 39c of the switch 39 periodically contacts with and separates from the first fixed contact 39a and a second fixed contact 39b of the switch 39 in a manner and at a timing similar to those of the switch 37. Specifically, when the output signal from the quantizer 4 represents an independent frame, the movable contact 39c of the switch 39 contacts with the first fixed contact 39a of the switch 39 so that the output signal from the quantizer 4 is transmitted to the inverse quantizer 7. When the output signal from the quantizer 4 represents a dependent frame, the movable contact 39c of the switch 39 contacts with the second fixed contact 39b of the switch 39 so that the transmission of the output signal from the quantizer 4 to the inverse quantizer 7 is interrupted. In this way, only the output signal from the quantizer 4 which represents an independent frame is transmitted to the inverse quantizer 7.

The independent-frame output signal from the quantizer 4 is subjected to an inverse quantization by the inverse quantizer 7 so that it is converted into a representative (setting of a representative). The representative outputted from the inverse quantizer 7 is subjected to an inverse orthogonal transform by an inverse transform device 8. The output signal from the inverse transform device 8 corresponds to a reproduced signal of an independent frame. The output signal from the inverse transform device 8, that is, the reproduced signal of an independent frame, is written into a frame memory 32.

A first fixed contact 40a of a switch 40 is connected to the output terminal of the frame memory 32. A second fixed contact 40b of the switch 40 has no connection with other circuits. A movable contact 40c of the switch 40 is connected to an input terminal of a frame memory 33. The movable contact 40c of the switch 40 periodically contacts with and separates from the first fixed contact 40a and the second fixed contact 40b of the switch 40 in a manner and at a timing similar to those of the switch 37. Specifically, when the output signal from the inverse transform device 8 which represents the current independent frame is written into the frame memory 32, the movable contact 40c of the switch 40 connects with the first fixed contact 40a of the switch 40 so that the reproduced signal of the preceding independent frame is transferred from the frame memory 32 to the frame memory 33 via the switch 40. In this way, the reproduced signal of the current independent frame and the reproduced signal of the preceding independent frame are prepared in the frame memory 32 and the frame memory 33 respectively.

The reproduced signal of the current independent frame and the reproduced signal of the preceding independent frame remain stored in the frame memory 32 and the frame memory 33 respectively until the frame memory 32 is fed with the reproduced signal of the subsequent independent frame from the inverse transform device 8. The reproduced signal of the current independent frame and the reproduced signal of the preceding independent frame are repeatedly outputted from the frame memory 32 and the frame memory 33 to multipliers 34 and 35 respectively. Specifically, the number of times of outputting the reproduced signal of the current independent frame and the reproduced signal of the preceding independent frame is equal to N−1.

The multiplier 34 multiplies the reproduced signal of the current independent frame by a weight coefficient $\alpha$ and outputs the resultant to an adder 36. The multiplier 35 multiplies the reproduced signal of the preceding independent frame by a weight coefficient $(1-\alpha)$ and outputs the resultant to the adder 36. The adder 36 adds the resultants of the multiplications, generating a prediction signal fed to the subtracter 2.

The weight coefficients $\alpha$ and $(1-\alpha)$ are determined in accordance with the time relation between the dependent frame inputted into the subtracter 2 and the independent frames related to the prediction signal inputted into the subtracter 2. For example, a linear prediction is used in the determination of the weight coefficients $\alpha$ and $(1-\alpha)$. Specifically, the weight coefficient $\alpha$ is given by the following equation.

$$\alpha = (m - mp)/N$$

where the character m denotes the order number (1, 2, 3, ...) of the frame being a coded object; the character mp denotes the order number (0, N, 2N, ...) of the previous independent frame; the number m is larger than the number mp; and the character N denotes a predetermined natural number equal to or larger than 2.

Figures 5, 6:
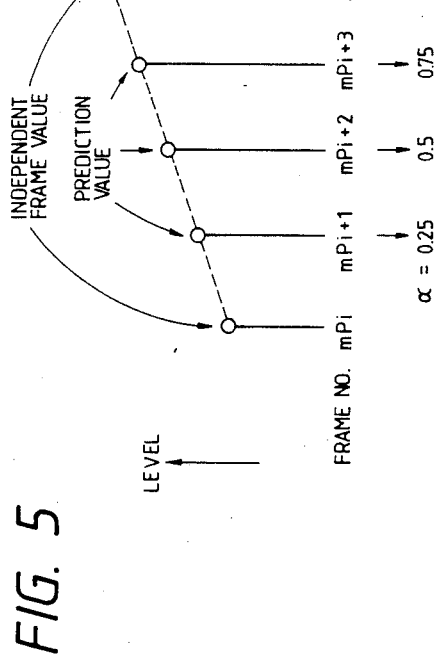
FIG. 5 is a diagram showing the relation between prediction values and successive frames in the encoding system of FIG. 4.
FIG. 6 is a block diagram of a decoding system according to the first embodiment of this invention.

FIG. 5 shows the relation between the frame number and the level of the prediction signal (the prediction value) in the case where the number N equals 4. In the generation of the prediction signal, a larger weight is offered to the independent frame closer to the objective dependent frame while a smaller weight is offered to the other independent frame. As understood from FIG. 5, in the case where display information of dependent frames linearly varies from the display information of the preceding independent frame to the display information of the current independent frame, very accurate prediction values are presented.

In the encoding system of FIG. 4, the operation of the switches 37 and 38 determines independent frames which are separated in a time axis at equal intervals corresponding to a predetermined number of frames. In addition, dependent frames are defined between independent frames. The inter-frame correlation between coded data is cut at each independent frame. Therefore, a visual search is enabled by decoding only data of independent frames or by performing a random access in unit corresponding to independent frames.

In the encoding system of FIG. 4, the prediction signal is generated by adding the data of the two adjacent independent frames with variable weighting parameters. Specifically, the weight coefficients $\alpha$ and $(1-\alpha)$ used in the generation of the prediction signal are determined in accordance with the time relation between the dependent frame inputted into the subtracter 2 and the independent frames related to the prediction signal inputted into the subtracter 2. Therefore, the prediction can well follow the variation of display information between successive frames, and an S/N (a signal to noise ratio) of the prediction signal can be high.

In the encoding system of FIG. 4, encoded data are arranged symmetrically on a time axis so that a reverse reproduction of data from a recording medium can be realized.

Figure 11:
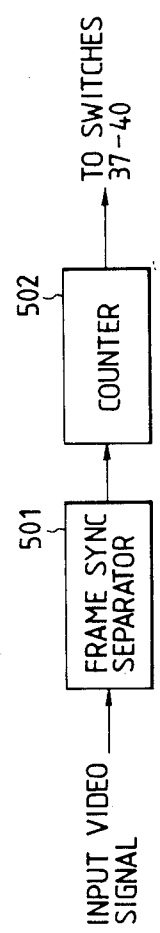
FIG. 11 is a block diagram of a circuit for generating a control signal fed to the switches of FIG. 4.
Figure 12:
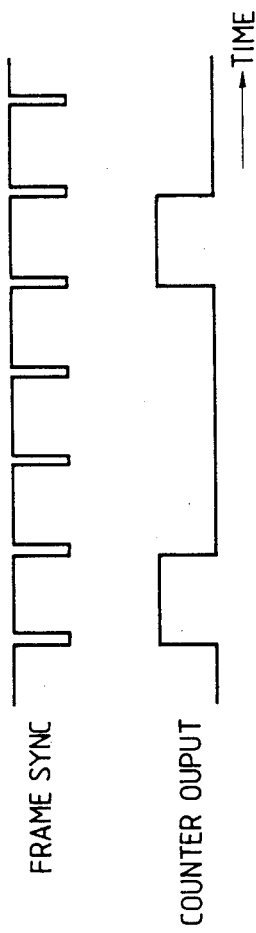
FIG. 12 is a timing diagram of signals generated in the circuit of FIG. 11.

The switches 37-40 are changed in response to a switch control signal. FIG. 11 shows a circuit for generating the switch control signal. As shown in FIG. 11, the switch control circuit includes a frame sync separator 501 which separates a frame sync signal from the input video signal. As shown in FIG. 12, the frame sync signal has a train of pulses. The pulses of the frame sync signal outputted from the frame sync separator 501 are counted by a counter 502. Each time four successive pulses of the frame sync signal are counted by the counter 502, the counter 502 outputs a pulse as shown in FIG. 12. The duration of each output pulse from the counter 502 agrees with the one-frame period. The sequentially-outputted pulses from the counter 502 compose the switch control signals fed to the switches 37-40.

FIG. 6 shows an inter-frame predictive decoding system according to the first embodiment of this invention. With reference to FIG. 6, variable-length digital data is fed to a decoder 22 via an input terminal 21. The decoder 22 converts the variable-length data into original fixed-length data. The output data from the decoder 22 is subjected to an inverse quantization by an inverse quantizer 23 so that it is converted into a representative (setting of a representative). The representative outputted from the inverse quantizer 23 is subjected to an inverse orthogonal transform by an inverse transform device 24. For independent frames, the output signal from the inverse transform device 24 corresponds to a reproduced video signal. For dependent frames, the output signal from the inverse transform device 24 corresponds to a prediction error signal.

The output signal from the inverse transform device 24 is applied to a movable contact 47c of a switch 47. A first fixed contact 47a of the switch 47 is connected to an input terminal of a frame memory 42. A second fixed contact 47b of the switch 47 is connected to an adder 41. The movable contact 47c of the switch 47 periodically changes between a first position and a second position at a predetermined period. When the movable contact 47c of the switch 47 assumes the first position, it contacts with the first fixed contact 47a of the switch 47 and separates from the second fixed contact 47b of the switch 47. When the movable contact 47c of the switch 47 assumes the second position, it contacts with the second fixed contact 47b of the switch 47 and separates from the first fixed contact 47a of the switch 47. When the output signal from the inverse transform device 24 represents an independent frame, the movable contact 47c of the switch 47 contacts with the first fixed contact 47a of the switch 47 so that the independent-frame signal is fed to and written into the frame memory 42. When the output signal from the inverse transform device 24 represents a dependent frame, the movable contact 47c of the switch 47 contacts with the second fixed contact 47b of the switch 47 so that the dependent-frame signal is fed to the adder 41.

The adder 41 adds the dependent-frame signal and a prediction signal, reproducing a digitized video signal of a dependent frame. The prediction signal will be explained later. The adder 41 outputs the reproduced video signal of a dependent frame to a second fixed contact 48b of a switch 48. A first fixed contact 48a of the switch 48 is connected to a first fixed contact 49a of a switch 49 which will be explained later. A movable contact 48c of the switch 48 is connected to an output terminal 26. The movable contact 48c of the switch 48 periodically contacts with and separates from the first fixed contact 48a and the second fixed contact 48b of the switch 48 in a manner and at a timing similar to those of the switch 47. Specifically, when the adder 41 outputs the reproduced video signal of a dependent frame, the movable contact 48c of the switch 48 contacts with the second fixed contact 48b of the switch 48 so that the dependent-frame video signal is transmitted from the adder 41 to the output terminal 26 via the switch 48.

As described previously, the output signal from the inverse transform device 24 which agrees with the reproduced signal of an independent frame is written into the frame memory 42. A movable contact 49c of a switch 49 is connected to the output terminal of the frame memory 42. A first fixed contact 49a of the switch 49 is connected to an input terminal of a frame memory 43. A second fixed contact 49b of the switch 49 has no connection with other circuits. The movable contact 49c of the switch 49 periodically contacts with and separates from the first fixed contact 49a and the second fixed contact 49b of the switch 49 in a manner and at a timing similar to those of the switch 47. Specifically, when the output signal from the inverse transform device 24 represents the current independent frame and is thus written into the frame memory 42, the movable contact 49c of the switch 49 connects with the first fixed contact 49a of the switch 49 so that the reproduced signal of the preceding independent frame is transferred from the frame memory 42 to the frame memory 43 via the switch 49. At the same time, the movable contact 48c of the switch 48 connects with the first fixed contact 48a of the switch 48 so that the reproduced signal of the preceding independent frame is transferred from the frame memory 42 to the output terminal 26 via the switches 48 and 49. As understood from the previous description, the reproduced signal of the current independent frame and the reproduced signal of the preceding independent frame are prepared in the frame memory 42 and the frame memory 43 respectively.

The reproduced signal of the current independent frame and the reproduced signal of the preceding independent frame remain stored in the frame memory 42 and the frame memory 43 respectively until the frame memory 42 is fed with the reproduced signal of the subsequent independent frame from the inverse transform device 24. The reproduced signal of the current independent frame and the reproduced signal of the preceding independent frame are repeatedly outputted from the frame memory 42 and the frame memory 43 to multipliers 44 and 45 respectively. Specifically, the number of times of outputting the reproduced signal of the current independent frame and the reproduced signal of the preceding independent frame is equal to $N-1$.

The multiplier 44 multiplies the reproduced signal of the current independent frame by a weight coefficient $\alpha$ and outputs the resultant to an adder 46. The multiplier 45 multiplies the reproduced signal of the current independent frame by a weight coefficient $(1-\alpha)$ and outputs the resultant to the adder 46. The adder 46 adds the resultants of the multiplications, generating a prediction signal fed to the adder 41. The weight coefficients $\alpha$ and $(1-\alpha)$ are determined similarly to the determination of the weight coefficients in the encoding system of FIG. 4.

The switches 47–49 are changed in response to a control signal generated by a circuit similar to the circuit of FIG. 11.

During the processing of the input video signal by the encoding system of FIG. 4, independent frames are advanced relative to dependent frames. To compensate the advance of the independent frames, the reproduced video signal of an independent signal is outputted from the frame memory 42 to the output terminal 26 when the prediction process related to dependent frames between two independent frames is completed. Accordingly, the frame memory 42 also functions to perform the time correction.

DESCRIPTION OF THE SECOND PREFERRED EMBODIMENT

Figure 7:
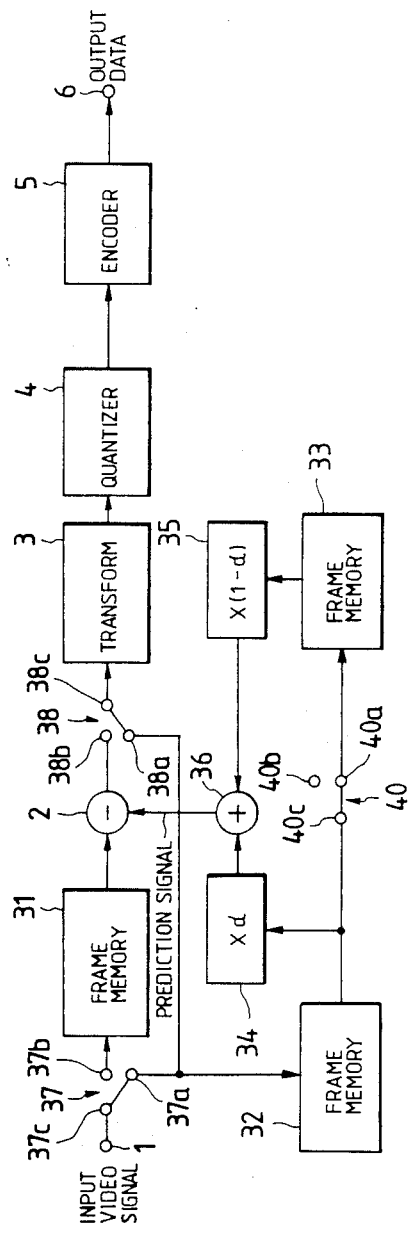
FIG. 7 is a block diagram of an inter-frame predictive encoding system according to a second embodiment of this invention.

FIG. 7 shows an inter-frame predictive encoding system according to a second embodiment of this invention which is similar to the embodiment of FIG. 4 except for designs explained later.

In the encoding system of FIG. 7, the inverse quantizer 7, the inverse transform device 8, and the switch 39 (see FIG. 4) are omitted while the input terminal of the frame memory 32 is connected to the first fixed contact 37a of the switch 37.

When the input video signal of an independent frame is fed to the orthogonal transform device 3 via the switches 37 and 38, the independent-frame signal is also fed to the frame memory 32 and is written thereinto. Accordingly, the input video signal of independent frames is directly used in the generation of a prediction signal fed to the subtracter 2. It should be noted that, in the encoding system of FIG. 4, the resultant of the processing of the input video signal of an independent frame by the devices 3, 4, 7, and 8 is used in the generation of a prediction signal.

The encoding system of FIG. 7 dispenses with a decoding process. In addition, the encoding system of FIG. 7 has advantages similar to those of the encoding system of FIG. 4.

DESCRIPTION OF THE THIRD PREFERRED EMBODIMENT

In an inter-frame predictive encoding system according to a third embodiment of this invention, frames are separated into independent frames and dependent frames as in the embodiment of FIGS. 3–6.

Figure 8:
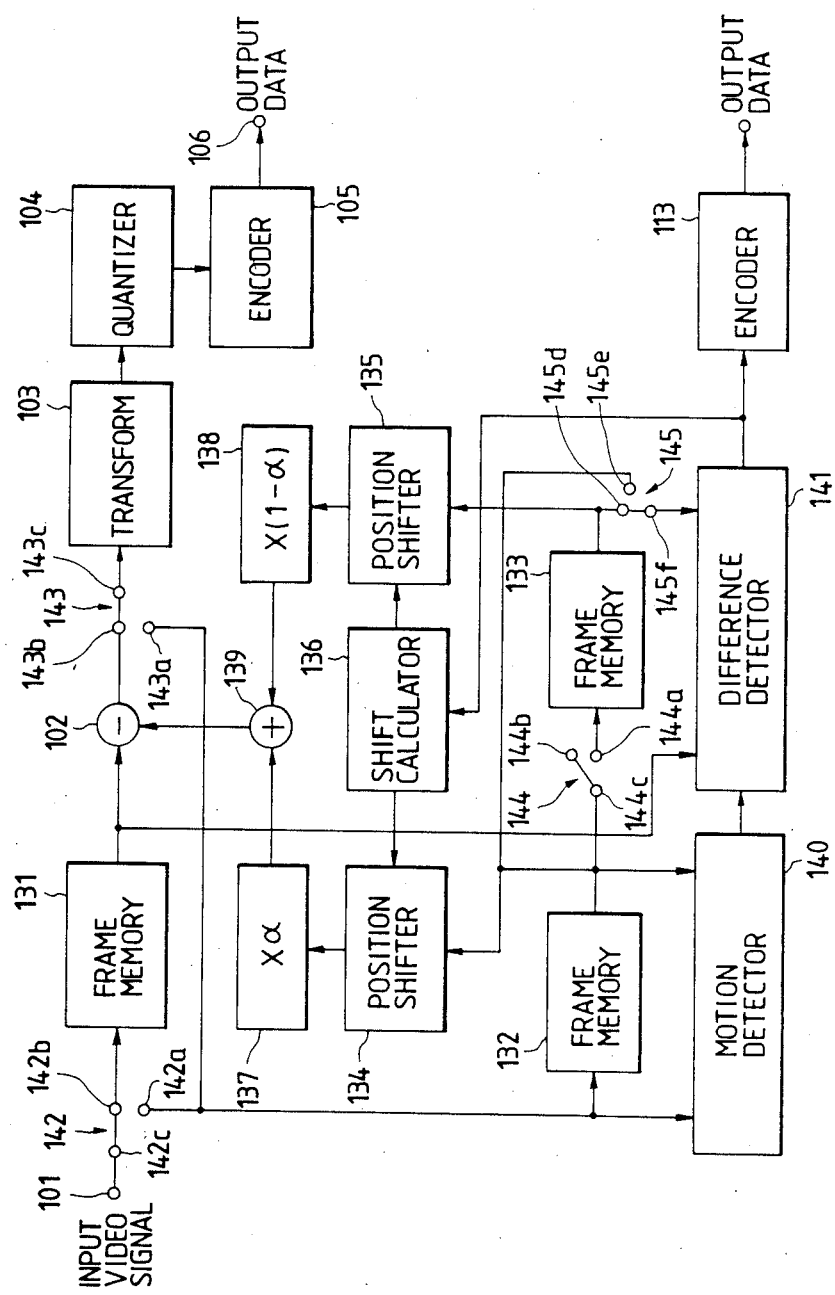
FIG. 8 is a block diagram of an inter-frame predictive encoding system according to a third embodiment of this invention.

FIG. 8 shows an inter-frame predictive encoding system according to a third embodiment of this invention. With reference to FIG. 8, a digitized video signal is fed to a movable contact 142c of a switch 142 via an input terminal 101. The movable contact 142c of the switch 142 periodically changes between a first position and a second position at a predetermined period. When the movable contact 142c of the switch 142 assumes the first position, it contacts with a first fixed contact 142a of the switch 142 and separates from a second fixed contact 142b of the switch 142. When the movable contact 142c of the switch 142 assumes the second position, it contacts with the second fixed contact 142b of the switch 142 and separates from the first fixed contact 142a of the switch 142. As will be made clear hereinafter, when the movable contact 142c of the switch 142 contacts with the first fixed contact 142a of the switch 142, the frame represented by the current input video signal is defined as an independent frame. Otherwise, the frame represented by the current input video signal is defined as a dependent frame.

When the movable contact 142c of the switch 142 contacts with the first fixed contact 142a of the switch 142, the input video signal is transmitted through the switch 142 to a first fixed contact 143a of a switch 143. A movable contact 143c of the switch 143 is connected to an input terminal of an orthogonal transform device 103. The movable contact 143c of the switch 143 periodically contacts with and separates from the first fixed contact 143a and a second fixed contact 143b of the switch 143 in a manner and at a timing similar to those of the switch 142. Specifically, when the movable contact 142c of the switch 142 contacts with the first fixed contact 142a of the switch 142, the movable contact 143c of the switch 143 contacts with the first fixed contact 143a of the switch 143 so that the input video signal is further transmitted through the switch 143 to the orthogonal transform device 103.

When the movable contact 142c of the switch 142 contacts with the second fixed contact 142b of the switch 142, the input video signal is transmitted through the switch 142 to a multi-frame memory 131. The multi-frame memory 131 delays the input video signal by a time corresponding to a predetermined number of frames. Specifically, the delay time of the multi-frame memory 131 corresponds to $(N-1)$ frames in the case where one independent frame occurs per N successive frames and the letter N denotes a predetermined natural number equal to two or greater. The output video signal from the multi-frame memory 131 is fed to a subtracter 102. The subtracter 102 subtracts a prediction signal from the video signal to generate a prediction error (difference) signal. The prediction signal will be explained later. The prediction error signal is outputted from the subtracter 102 to the second fixed contact 143b of the switch 143. When the movable contact 142c of the switch 142 contacts with the second fixed contact 142b of the switch 142, the movable contact 143c of the switch 143 contacts with the second fixed contact 143b of the switch 143 so that the prediction error signal is transmitted through the switch 143 to the orthogonal transform device 103.

During one-frame periods separated by equal intervals corresponding to a predetermined number of frames, that is, during periods corresponding to independent frames, the movable contact 142c of the switch 142 contacts with the first fixed contact 142a of the switch 142 contacts while the movable contact 143c of the switch 143 contacts with the first fixed contact 143a of the switch 143. During other periods, that is, during periods corresponding to dependent frames, the movable contact 142c of the switch 142 contacts with the second fixed contact 142b of the switch 142 while the movable contact 143c of the switch 143 contacts with the second fixed contact 143b of the switch 143.

The video signal of the independent-frame or the prediction error signal of the dependent-frame outputted from the subtracter 102 is subjected to an orthogonal transform by the orthogonal transform device 103. The orthogonal transform increases the efficiency of encoding. The output signal from the orthogonal transform device 103 is quantized by a quantizer 104. The output data from the quantizer 104 is encoded by an encoder 105 into variable-length codes such as Huffman codes. The codes outputted from the encoder 105 are transmitted via an output terminal 106.

The independent-frame video signal is transmitted via the switch 142 and is written into a frame memory 132. A movable contact 144c of a switch 144 is connected to an output terminal of the frame memory 132. A first fixed contact 144a of the switch 144 is connected to an input terminal of a frame memory 133. A second fixed contact 144b of the switch 144 has no connection with other circuits. The movable contact 144c of the switch 144 periodically contacts with and separates from the first fixed contact 144a and the second fixed contact 144b of the switch 144 in a manner and at a timing similar to those of the switch 142. Specifically, when the current independent-frame signal is transmitted via the switch 142 and is written into the frame memory 132, the movable contact 144c of the switch 144 connects with the first fixed contact 144a of the switch 144 so that the preceding independent-frame signal is transferred from the frame memory 132 to the frame memory 133 via the switch 144. In this way, the current independent-frame signal and the preceding independent-frame signal are prepared in the frame memory 132 and the frame memory 133 respectively.

The current independent-frame signal and the preceding independent-frame signal remain stored in the frame memory 132 and the frame memory 133 respectively until the frame memory 132 is fed with the subsequent independent-frame signal via the switch 142. The current independent-frame signal and the preceding independent-frame signal are repeatedly outputted from the frame memory 132 and the frame memory 133 to position shifters 134 and 135 respectively. The position shifter 134 two-dimensionally shifts the current independent-frame signal by a magnitude which is determined by a shift calculator 136. Similarly, the position shifter 135 shifts the preceding independent-frame signal by a magnitude which is determined by the shift calculator 136.

The position shifter 134 includes an address generator, and a temporal memory into and from which the current independent-frame signal is written and read in accordance with an address signal from the address generator. During the reading out the signal from the temporal memory, the address generator shifts addresses relative to the write addresses in accordance with a signal from the shift calculator 136 to provide the two dimensional shift of the current independent-frame signal. The position shifter 135 is designed similarly to the position shifter 134.

An output signal from a vector difference detector 141 which represents a motion vector is inputted into the shift calculator 136. The shift calculator 136 multiplies the motion vector by $(N-i)$, generating a magnitude of shift fed to the position shifter 134. In addition, the shift calculator 136 multiplies the motion vector by $(-i)$, generating a magnitude of shift fed to the position shifter 135. The character i denotes the order number of a predicted frame which is determined in view of the time relation between frames. Specifically, the number i is 0 for each independent frame and varies as $i = 1, 2, 3, \ldots, (N-i)$ for dependent frames.

Output signals from the position shifters 134 and 135 are fed to multipliers 137 and 138 respectively. The multiplier 137 multiplies the output signal from the position shifter 137 by a weight coefficient $\alpha$ and feeds the resultant to an adder 139. The multiplier 138 multiplies the output signal from the position shifter 135 by a weight coefficient $(1-\alpha)$ and feeds the resultant to the adder 139. The adder 139 adds the resultants of the multiplications, generating a prediction signal fed to the subtracter 102. For example, according to a linear prediction, the weight coefficient $\alpha$ is defined as $i/N$.

The current independent-frame video signal is transmitted via the switch 142 to a motion vector detector 140. The preceding independent-frame video signal is fed from the frame memory 132 to the motion vector detector 140. The motion vector detector 140 detects motion vectors from the current independent-frame signal and the preceding independent-frame signal in a known way such as a block matching method. The motion vector detector 140 outputs a signal representative of the detected motion vectors to the vector difference detector 141.

Figure 9:
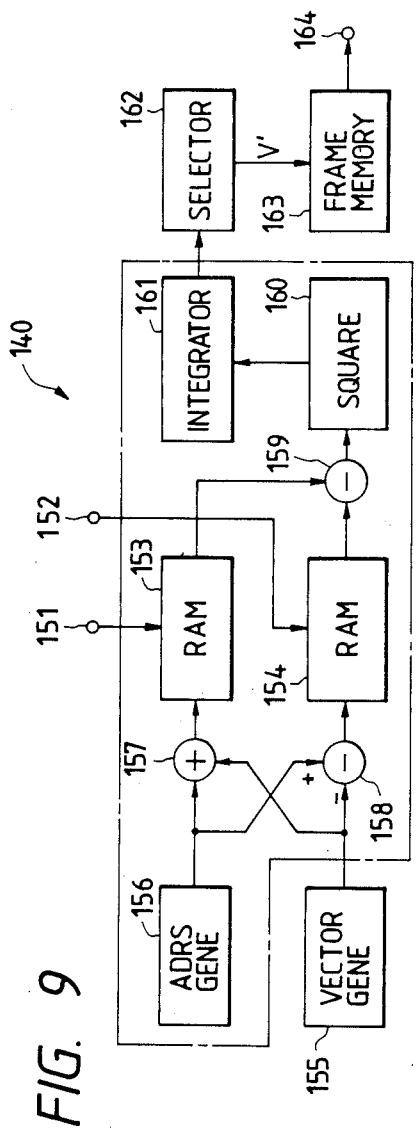
FIG. 9 is a block diagram of the motion vector detector of FIG. 8.

As shown in FIG. 9, the motion vector detector 140 includes RAMs 153 and 154 receiving the current independent-frame signal and the preceding independent-frame signal via input terminals 151 and 152 respectively. The current independent-frame signal and the preceding independent-frame signal are written into the RAMs 153 and 154 respectively. Each of the signals stored in the RAMs 153 and 154 is divided into spatial regions whose number is greater than the number of spatial regions corresponding to blocks of $8 \times 8$ or $16 \times 16$ pixels which are used in determining motion vectors.

Since motion vectors are used for dependent frames between the current independent frame and the preceding independent frame, it is necessary to handle the two independent frames similarly. Therefore, the two frames are moved symmetrically during the determination of motion vectors.

During the writing of the signal into each of the RAMs 153 and 154, addresses fed to each of the RAMs 153 and 154 are directly made by main addresses of pixels in blocks. During the reading of the signal from each of the RAMs 153 and 154, addresses fed to each of the RAMs 153 and 154 are modified by a value of motion vectors which are generated in a vector generator 155. The writing of the signal into each of the RAMs 153 and 154 is performed once for each independent frame, while the reading of the signal from each of the RAMs 153 and 154 is repeatedly performed a number of times which equals the number of motion vectors. The address shift is composed of a vector which is generated by a vector generator 155 in correspondence with intervals of N frames. For example, the vector generator 155 includes a counter.

Specifically, addresses to the RAM 153 for the current independent frame are generated by adding the vector output from the vector generator 155 to an output signal from a main address generator 156. This addition is performed by an adder 157. For example, the main address generator 156 includes a counter. Addresses to the RAM 154 for the preceding independent frame are generated by subtracting the vector output of the vector generator 155 from an output signal of the main address generator 156. This subtraction is performed by a subtracter 158.

A subtracter 159 calculates a difference between the output data from the RAMs 153 and 154. A squaring device 160 calculates the square of the data difference. An integrator 161 accumulates the output data from the squaring device 160 during an interval corresponding to a period of one block. The integrator 161 obtains a mean square error for a setting vector.

The section corresponding to a part surrounded by the broken line of FIG. 9 includes the devices 153, 154, 156, 157, 158, 159, 160, and 161. This section performs a process of detecting a mean square error. For each setting vector in each block, the detecting process is repeatedly performed a number of times which equals the number of pixels within one block.

The mean square errors of respective vectors are sequentially fed from the integrator 161 to a vector selector 162. The vector selector 162 detects the smallest among the mean square errors and outputs the motion vector corresponding to the selected smallest mean square error as a motion vector V' representing a motion corresponding to each of blocks of one frame. For example, the vector selector 162 includes a smallest-value selector of the serial input type which is composed of a combination of latches and comparators. The motion vector V' is generated for each block. The motion vectors of one frame are stored into a frame memory 163. During the prediction process for dependent frames between two adjacent independent frames, the motion vectors are repeatedly read out from the frame memory 163 and are transmitted via an output terminal 164 to the vector difference detector 141.

Returning to FIG. 8, the vector difference detector 141 performs a process of calculating differences between vectors in each predicted frame. As will be made clear hereinafter, some circuit components are common to the vector difference detector 141 and the motion vector detector 140.

The vector difference detector 141 is fed with the dependent-frame signal from the multi-frame memory 131. A first fixed contact 145d and a second fixed contact 145e of a switch 145 are connected to the output terminals of the frame memories 132 and 133 respectively. A movable contact 145f of the switch 145 is connected to the vector difference detector 141. The movable contact 145f of the switch 145 periodically changes between a first position and a second position at a predetermined period. When the movable contact 145f of the switch 145 assumes the first position, it contacts with the first fixed contact 145d of the switch 145 and separates from the second fixed contact 145e of the switch 145 so that the preceding independent-frame signal is fed from the frame memory 133 to the vector difference detector 141 via the switch 145. When the movable contact 145f of the switch 145 assumes the second position, it contacts with the second fixed contact 145e of the switch 145 and separates from the first fixed contact 145d of the switch 145 so that the current independent-frame signal is fed from the frame memory 132 to the vector difference detector 141 via the switch 145. In this way, the current independent-frame signal and the preceding independent-frame signal are alternately fed to the vector difference detector 141.

Specifically, the switch 145 is changed in response to the order number of a frame so that one of the current independent-frame signal and the preceding independent-frame signal is alternately and periodically selected and fed to the vector difference detector 141. Selected one of the current independent-frame signal and the preceding independent-frame signal relates to a larger weight in the predictive calculation.

Figure 10:
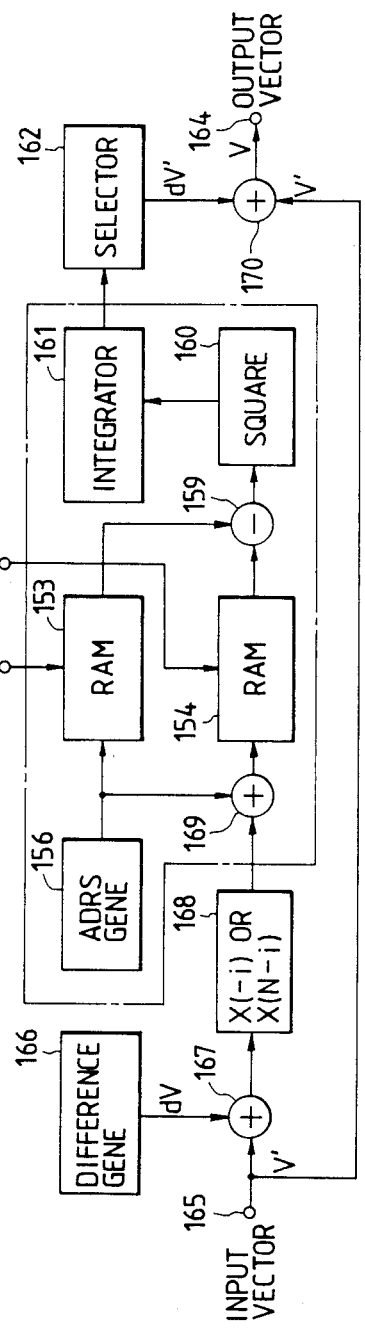
FIG. 10 is a block diagram of the vector difference detector of FIG. 8.

As shown in FIG. 10, the vector difference detector 141 includes the RAMs 153 and 154 receiving the dependent-frame signal and the independent-frame signal via the input terminals 151 and 152 respectively. The dependent-frame signal and the independent-frame signal are written into the RAMs 153 and 154 respectively.

The motion vector V' determined between the current independent frame and the preceding independent frame is transmitted from the motion vector detector 140 to an adder 167 via an input terminal 165. The adder 167 adds the motion vector V' and an output value vd from a vector difference generator 166, generating a resultant vector. For example, the vector difference generator 166 includes a counter.

A known detection of motion vectors use a method in which first vectors are set at a low distribution density and then second vectors are set around the first vectors at a high distribution density. The output value vd from the vector difference generator 166 corresponds to a vector difference determined in respect of setting the second vectors in the known method.

A multiplier 168 multiplies the resultant vector by $(-i)$ for the preceding independent frame. The multiplier 168 multiplies the resultant vector by $(N-i)$ for the current independent frame. The character i denotes the order number of a predicted frame which is determined in view of the time relation between frames. Specifically, the number i is 0 for each independent frame and varies as $i = 1, 2, 3, \ldots, (N-i)$ for dependent frames. The output signal from the multiplier 168 represents an address shift.

During the writing of the signal into each of the RAMs 153 and 154, addresses fed to each of the RAMs 153 and 154 are directly made by main addresses of pixels in blocks. During the reading of the signal from the RAM 153, addresses fed to the RAM 153 are also directly made by the main addresses. During the reading of the signal from the RAM 154, addresses fed to the RAM 154 are made by adding an address shift to the main addresses.

Specifically, reading addresses to the RAM 154 for the independent frame are generated by adding the address shift from the multiplier 168 to the output signal from the main address generator 156. This addition is performed by an adder 169. The output signal from the main address generator 156 are fed to the RAM 153 as reading and writing addresses.

The subtracter 159 calculates a difference between the output data from the RAMs 153 and 154. The squaring device 160 calculates the square of the data difference. The integrator 161 accumulates the output data from the squaring device 160 during an interval corresponding to a period of one block. The integrator 161 obtains a mean square error for a setting vector.

The mean square errors of respective vectors are sequentially fed from the integrator 161 to the vector selector 162. The vector selector 162 detects the smallest among the mean square errors and outputs the motion vector corresponding to the detected smallest mean square error as a motion vector dV' representing a motion corresponding to each of blocks of one frame. The motion vector dV' is generated for each block. An adder 170 adds the motion vector dV' and the motion vector V', generating a final motion vector V. The final motion vector V outputted from the adder 170 is transmitted via the output terminal 164 to the shift calculator 136 and an encoder 113 (see FIG. 8). The output data from the vector difference detector 141 is encoded by the encoder 113 into variable-length codes such as Huffman codes.

The motion vector V' or the motion vector dV' is selected from 9 different types while the final motion vector V is selected from 49 different vectors.

The processing by the motion vector detector 140 and the processing by the vector difference detector 141 are performed during different periods respectively. This design enables reliable operation of the detectors 140 and 141 although the circuit components are common to the detectors 140 and 141. It should be noted that the circuit components of the detector 140 may separate from the circuit components of the detector 141.

ADVANTAGE OF THE INVENTION AND ANOTHER EMBODIMENT

As understood from the previous description, in this invention, a signal of a frame is coded by referring to signals of frames which precede and follow that frame. This function enables the present invention to produce new advantages such as an increase in the efficiency of encoding.

While the reference frames (the independent frames) are independently coded in the previously-mentioned embodiments, other designs may be adopted. For example, the reference frames may be coded by use of the correlation between the reference frames to further increase the efficiency of encoding.

What is claimed is:

1. An inter-frame predictive encoding system comprising:
    means for separating successively-inputted frames of a video signal into reference frames and dependent frames, the reference frames being spaced at predetermined intervals, the dependent frames situated between the reference frames;
    means for encoding display information of the reference frames;
    means for predicting display information of each dependent frame on the basis of display information of reference frames which precede and follow said dependent frame respectively;
    means for generating an error between the predicted display information and corresponding actual display information of said dependent frame; and
    means for encoding said error.

2. The inter-frame predictive encoding system of claim 1 wherein said predicting means comprises means for multiplying the two dimensional position of the preceding reference frame by a first predetermined weight coefficient; means for multiplying the display information of the following reference frame by a second predetermined weight coefficient; and means for predicting the display information of the dependent frame on the basis of a resultant of said multiplication between the display information and the first weight coefficient and a resultant of said multiplication between the display information and the second weight coefficient.

3. In an inter-frame predictive encoding system comprising means for performing motion-compensated inter-frame prediction using motion vectors between successively inputted frames of a video signal;
    the improvement comprising:
    means for setting specified frames separated at equal intervals, the specified frames being selected from successively inputted frames of a video signal;
    means for detecting motion vectors between the specified frames;
    means for detecting motion vectors between adjacent non-specified frames between the specified frames as differences with respect to said motion vectors between the specified frames.

4. An inter-frame predictive encoding system as recited in claim 3 further comprising:
    means for generating a prediction signal for a non-specified frame between the specified frames on the basis of a signal of the specified frames which precede and follow the non-specified frame respectively;
    means for generating a prediction error representing a difference between the prediction signal and a signal of the non-specified frame corresponding thereto;
    encoding means for encoding said prediction error; and
    means for outputting and transmitting encoded data which are generated by the encoding in the encoding means.

5. An inter-frame predictive encoding system comprising:
    means for setting reference frames separated at equal intervals, the reference frames being selected from successively inputted frames of a video signal;
    first encoding means for encoding each of the reference frames;
    means for generating a prediction signal for a dependent frame between the reference frames on the basis of a signal of the reference frames which precede and follow the dependent frame respectively;

means for generating a prediction error representing a difference between the prediction signal and a signal of the dependent frame corresponding thereto;

second encoding means for encoding said prediction error; and means for outputting and transmitting encoded data which are generated by the encoding in the first encoding means and the second encoding means.

* * * * *